United States Patent [19]

Lee

[11] Patent Number: 5,995,139
[45] Date of Patent: Nov. 30, 1999

[54] SYSTEM FOR IDENTIFYING VISITORS USING CCTV CAMERA AND HOME COMPUTER

[75] Inventor: Chang-Ho Lee, Kyungki-do, Rep. of Korea

[73] Assignee: SamSung Electronics., Ltd., Suwon, Rep. of Korea

[21] Appl. No.: 08/719,376

[22] Filed: Sep. 25, 1996

[30] Foreign Application Priority Data

Sep. 25, 1995 [KR] Rep. of Korea .................. 95-31643

[51] Int. Cl.[6] .................. H04N 7/18; G08B 3/00; H04M 1/60
[52] U.S. Cl. .................. 348/143; 348/156; 340/539; 379/103
[58] Field of Search .................. 379/167, 103, 379/56, 58; 348/155, 156, 143, 149, 150, 151, 13, 14, 20, 157; 340/539, 531, 825.3, 517, 330, 541; H04M 11/00, 1/60, 9/00; G08B 3/00, 5/00; H01H 67/00; H04N 7/18, 9/47

[56] References Cited

U.S. PATENT DOCUMENTS

| Re. 34,895 | 4/1995 | Morotomi et al. . | |
| 4,370,675 | 1/1983 | Cohn . | |
| 4,821,118 | 4/1989 | Lafreniere . | |
| 4,843,461 | 6/1989 | Tatsumi et al. . | |
| 5,032,820 | 7/1991 | Tanikawa | 379/103 |
| 5,142,604 | 8/1992 | Lee . | |
| 5,280,266 | 1/1994 | Kao . | |
| 5,359,363 | 10/1994 | Kuban et al. | 348/143 |
| 5,382,943 | 1/1995 | Tanaka | 348/143 |
| 5,428,388 | 6/1995 | von Bauer et al. . | |
| 5,535,011 | 7/1996 | Yamagami et al. . | |
| 5,581,297 | 12/1996 | Koz et al. | 348/143 |
| 5,585,677 | 12/1996 | Cheon et al. . | |
| 5,635,981 | 6/1997 | Ribacoff | 348/156 |
| 5,664,203 | 9/1997 | Hong et al. . | |
| 5,708,820 | 1/1998 | Park et al. . | |

Primary Examiner—Anand S. Rao
Attorney, Agent, or Firm—Robert E. Bushnell, Esq.

[57] ABSTRACT

A system for identifying visitors using a closed-circuit television camera to generate image data by reading images of visitors and a microphone to convert the sound waves received from visitors into electric waves. A door-bell button has a call-bell function available for when a visitor calls and as well as a switch function for operating a computer while the computer is in a hibernation state. The computer system controls and stores the signals and image data from the CCTV camera, the microphone, and the call-bell button while a monitor which displays the image data. This system identifies visitors by storing the visitor's image sensed from an identification device while the owner a user is absent and reconfirms after by using a general purpose home computers; the system has a hibernation function and is inexpensive.

4 Claims, 4 Drawing Sheets

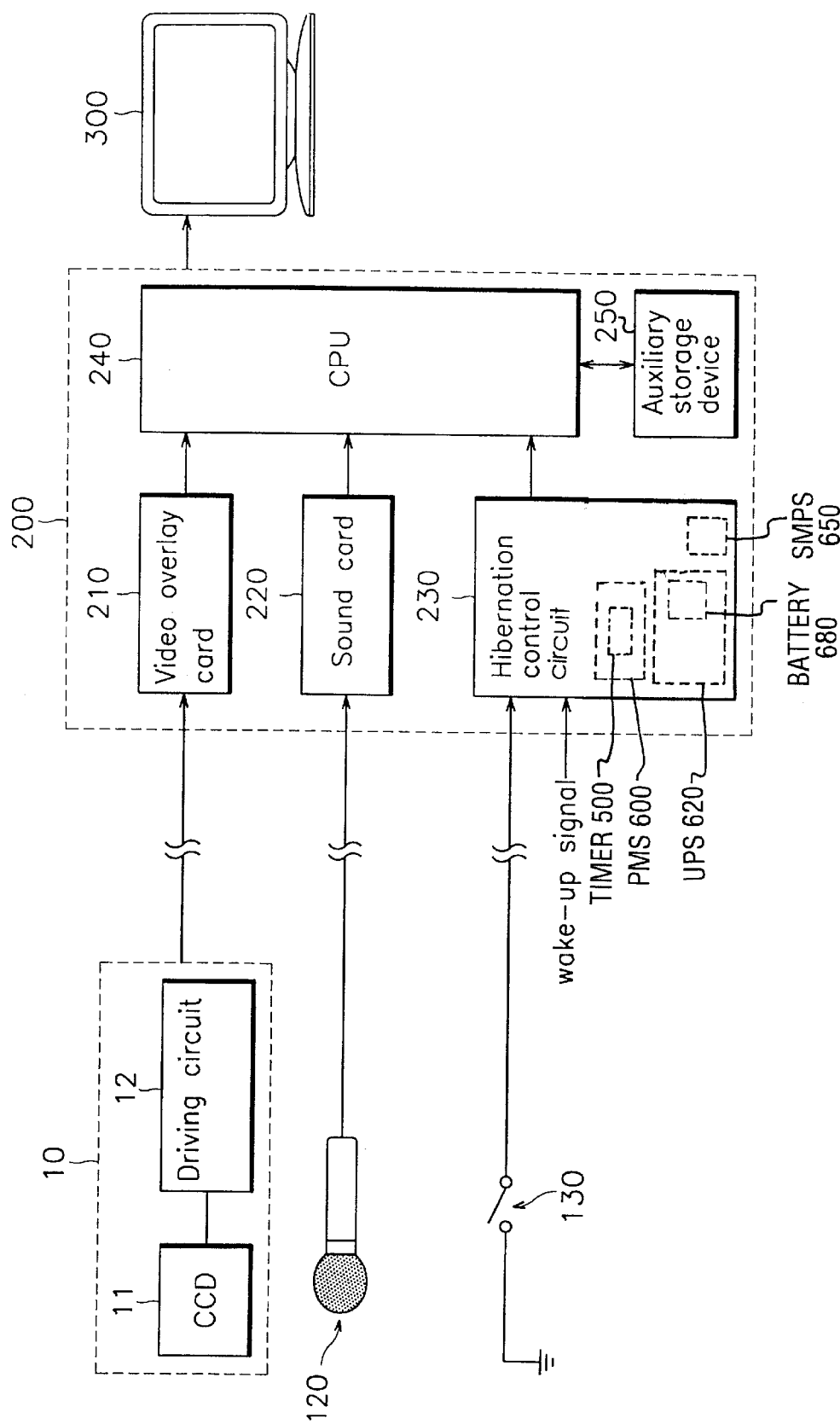

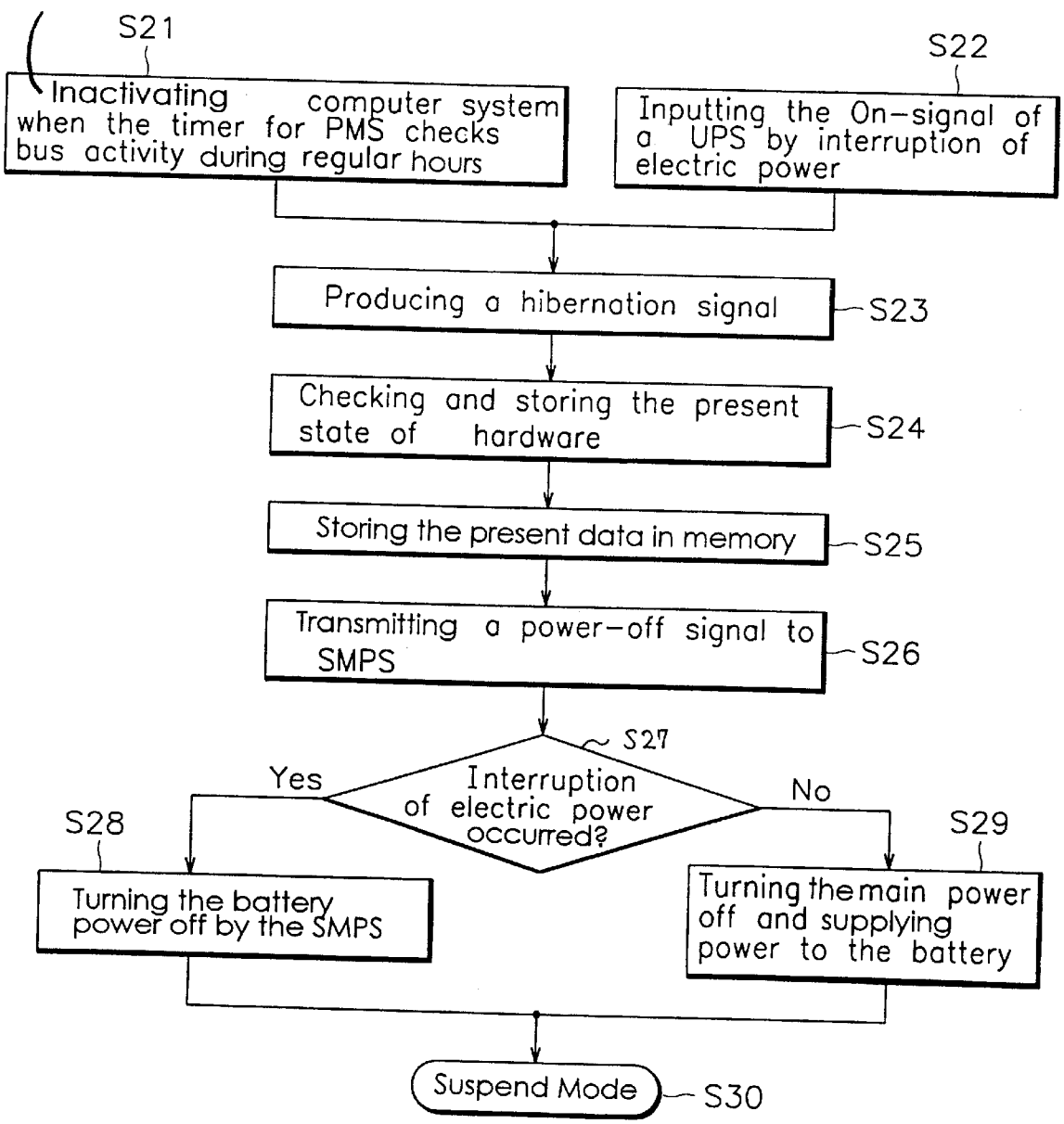

SYSTEM FOR IDENTIFYING VISITORS USING CCTV CAMERA AND HOME COMPUTER

CLAIM OF PRIORITY

This application makes refernce to, incorporates the same herein, and claims all benefits accruing under 35 U.S.C. §119 from an application for A System for Identifying visitors earlier filed in the Korean Industrial Property Office on Sep. 25, 1995 and there duly assigned Serial No. 31643/1995.

BACKGROUND OF THE INVENTION

1. Field of the Invention

The present invention relates to a system for identifying visitors more particularly, to a system for storing the visitor's image as sensed by an identification device while the owner of the premises is absent and subsequently reconfirming, the identity of the image by using a general purpose home computer.

2. Description of the Prior Art

Recently, using computers enable not only factories and laboratories but also family homes to automate. Contemporary designs for home automation systems typically identify visitors and control electric home appliances by using a communication apparatus. For example, there are systems for controlling the temperature automatically according to a preset temperature in summer and in winter, preparing dinner before returning home, opening the door automatically in response to the host's face and fingerprint, and identifying the coming and going of visitors.

An earlier design of a system for identifying visitors includes a CCTV (closed-circuit television) camera for outputting image data by reading images of visitors, a monitor for displaying the image data outputted from the CCTV camera and the image storing device for storing image data for identifying visitors. The CCTV camera includes a CCD (charge coupled device) for receiving the visitors image and for generating data according to the brightness of the light, and a driving circuit for processing the image signal received from the CCD and in order to provide data to the monitor or the image memory. In this type of design, the CCD receives the visitor's image and outputs an electrical signal according to the brightness of the light, the driving circuit receives the image from the CCD and transmits the image to the monitor, and the image data is displayed on the screen of the monitor, and the image storing device can replay data whenever required by the user.

I have found that with the designs of contemporary systems, the owners use the image storing device to stores and process the images of visitors through the CCTV camera in order to identify visitors while the user is absent from the premises.

The earlier image storing systems require their own place of installation and were relatively expensive. Also, the earlier systems stored and processed an image continuously during regular hours. So, there are problems that the power consumption is large and the image storing device searches from beginning to end when identifying visitors again.

One example of contemporary practice, Lee, U.S. Pat. No. 5,142,604 for System And Method For Picture Interphone Using Camcorder And TV, discloses a typical prior art arrangement using a TV monitor and a camcorder. The prior art device requires an expensive image storing device (that is—the camcorder) and further requires that the user search the video tape in sequence from the beginning to the end in order to identify the visitors. On the other hand, the present invention only requires a general purpose home computer having a multi-media function and a CCTV camera. The present invention does not use expensive equipment and enables the owner to perform the function of editing and identifying data easily and without the necessity of resorting to reviewing an entire video tape.

SUMMARY OF THE INVENTION

An object of the present invention is to provide an improved visitor identification system.

It is another object to provide a system for identifying visitors by storing and replaying images of visitors according to the operation of a computer when someone visits a house while the owner is absent.

It is still another object to provide a visitor identification system controlled by an inexpensive, off-the-shelf personal computer.

It is yet another object to provide a visitor identification system endowing an owner with video image editing functions.

It is still yet another object to provide a visitor identification system enabling an owner to easily identify a visitor without the necessity of reviewing the entire contents of a memory holding video data captured by the system.

It is also an object to provide a visitor identification system using an inexpensive, off-the shelf personal computer to control multi-media recording and replay of data obtained from visitors to the premises equipped with the system.

In order to achieve these and other objects, a visitor identification system is constructed with a closed-circuit television camera for generating image data by reading the images of visitors and a microphone for receiving and connecting the sound waves of visitors into electrical waves. A door-bell button which has a call-bell function is available to a visitors, and a hibernation control circuit responds to the door-bell by generating a resume signal in order to return the computer to operation from a hibernation state. A computer system processes and stores the signals from the door-bell button, and processes the data from the closed-circuit television camera and the microphone while a monitor displays the image data.

The above computer is a multimedia computer having an image capturing function, an audio recording function, and a hibernation function which is in a power saving mode during normal times.

BRIEF DESCRIPTION OF THE DRAWINGS

A more complete appreciation ofthe invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is a block diagram of a system constructed for identifying visitors in accordance with a preferred embodiment of the present invention;

FIG. 4 shows the suspension process of the hibernation module of FIG. 3; and

DETAILED DESCRIPTION OF THE PREFERRED EMBODIMENTS

Figure 1:
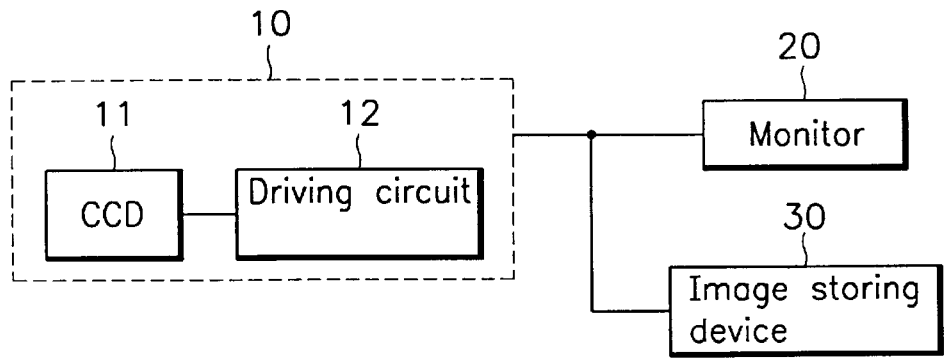
FIG. 1 is a block diagram of an earlier system for identifying visitors.

Turning now to the drawings, as shown in FIG. 1, an earlier system for identifying visitors includes a CCTV (closed-circuit television) camera 10 for outputting image data by reading the images of visitors, a monitor 20 for displaying the image data outputted from the CCTV camera 10, and an image storing device 30 for storing hnage data for identifying visitors. The CCTV camera includes a CCD (charge coupled device) 11 for receiving the visitor's image and for outputting data according to the brightness of light and driving circuit 12 for processing the image signal inputted from the CCD and for outputting data into the monitor 20 or the image storing device 30.

As shown in FIG. 2, a system for identifying visitors in accordance with a preferred embodiment ofthe present invention includes: a CCTV (closed-circuit television) camera 10 which reads the images of the visitors and outputs image data, a microphone 120 which converts the sound waves ofthe visitors into electrical waves; a call-bell button 130 which has a call-bell function when a visitor calls, and a hibernation control circuit 230 which outputs a resume signal making the computer operate in a hibernation state; a computer system 200 which operates, processes and stores the signals from the call-bell button, and processes and outputs the data from the closed-circuit television and the microphone; and a monitor 300 which displays the image data.

The CCTV camera 10 includes a CCD (charge coupled device) 11 for receiving the images of the visitors and outputs each data according to brightness of the images of the visitors and driving circuit 12 for processing the image signal inputted from the CCD and outputting the image data into the monitor or an image storing device.

The computer system 200 includes: a video overlay card 210 which enables the images of the visitors to be watched by receiving the image data from the CCTV 10 and outputting the data converted by a modulator; a sound card 220 which receives and amplifies the sound waves from the microphone; a hibernation control circuit 230 which has a suspend function and a resume function; a CPU (central processing unit) 240 which controls the video overlay card, the sound card, and the hibernation control circuit; and an auxiliary storage device 250 which stores the images of the visitors.

The hibernation control circuit also includes a UPS 620, SMPS 650, battery 680, a timer 500 and a PMS 600. The timer 500 is part of the PMS 600 while the battery 680 is part of the UPS 620. The elements contained in the hibernation control circuit 620 are disclosed in detail in U.S. Pat. Nos. 5,585,677, 5,664,203 and 5,708,820 and the information contained therein is incorporated by reference herein.

Figure 3:
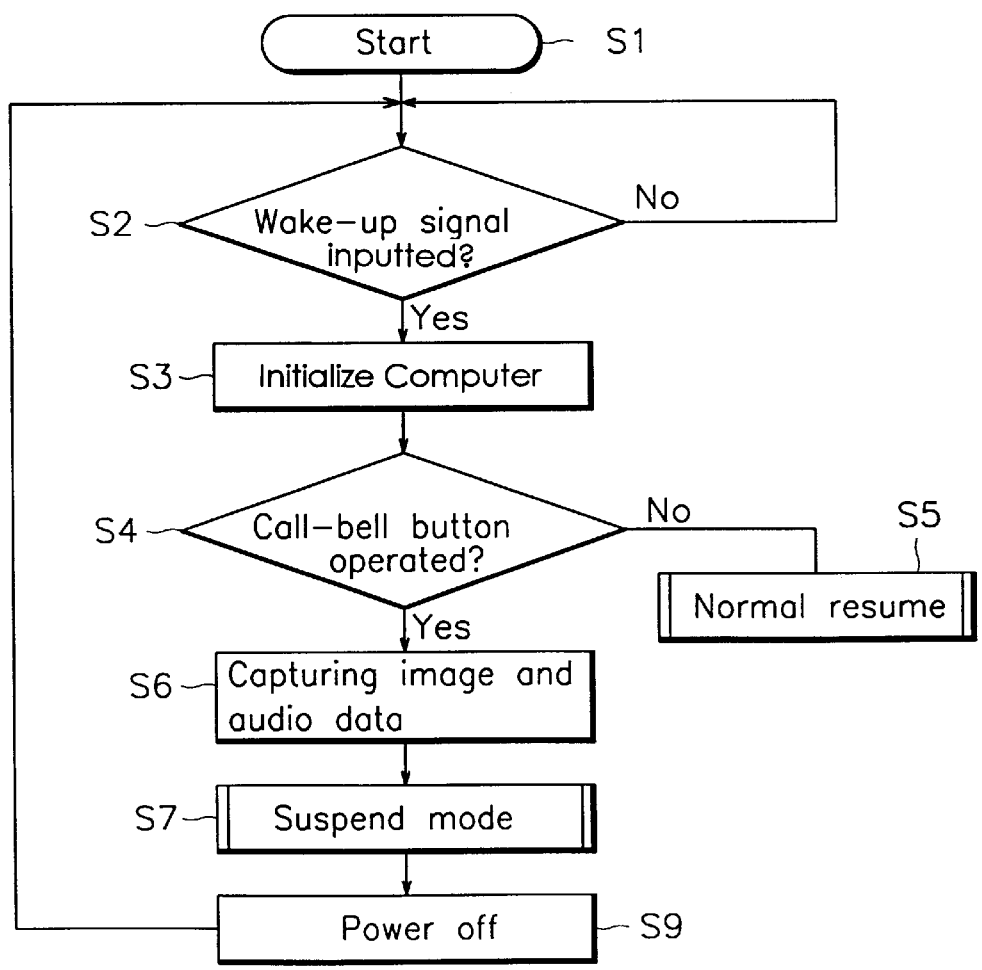
FIG. 3 is a flowchart of a system constructed for identifying visitors in accordance with a preferred embodiment of the present invention.

As shown in FIG. 3, a system for identifying visitors constructed as a preferred embodiment contemplates determining whether a wake-up signal has been inputted (S2); initializing a computer (S3); determining whether the wake-up signal is a signal from a call-bell button (S4); capturing image and sound data (S6); converting to a suspend mode after work completion (S7); turning the computer off (S9); and returning to step S2.

As shown in FIG. 4, the suspension process of a hibernation module may be performed by starting the operation of a computer (S20); inactivating the computer when a timer for PMS (power management system) checks a bus operation during regular hours (S21); inputting the on-signal of an UPS (uninterruptible power supply) by interruption of electric power into the PMS (S22); producing a hibernation signal (S23); checking and storing the present state of a hardware (S24); storing the present data in a memory (S25); transmitting a power-off-signal to a SMPS (switching mode power supply) (S26); determining whether interruption of electric power has occurred (S27); turning the power of a battery off by the SMPS (S28); turning the main power off and supplying the battery with power (S29); and maintaining a hibernation state (S30).

Figure 5:
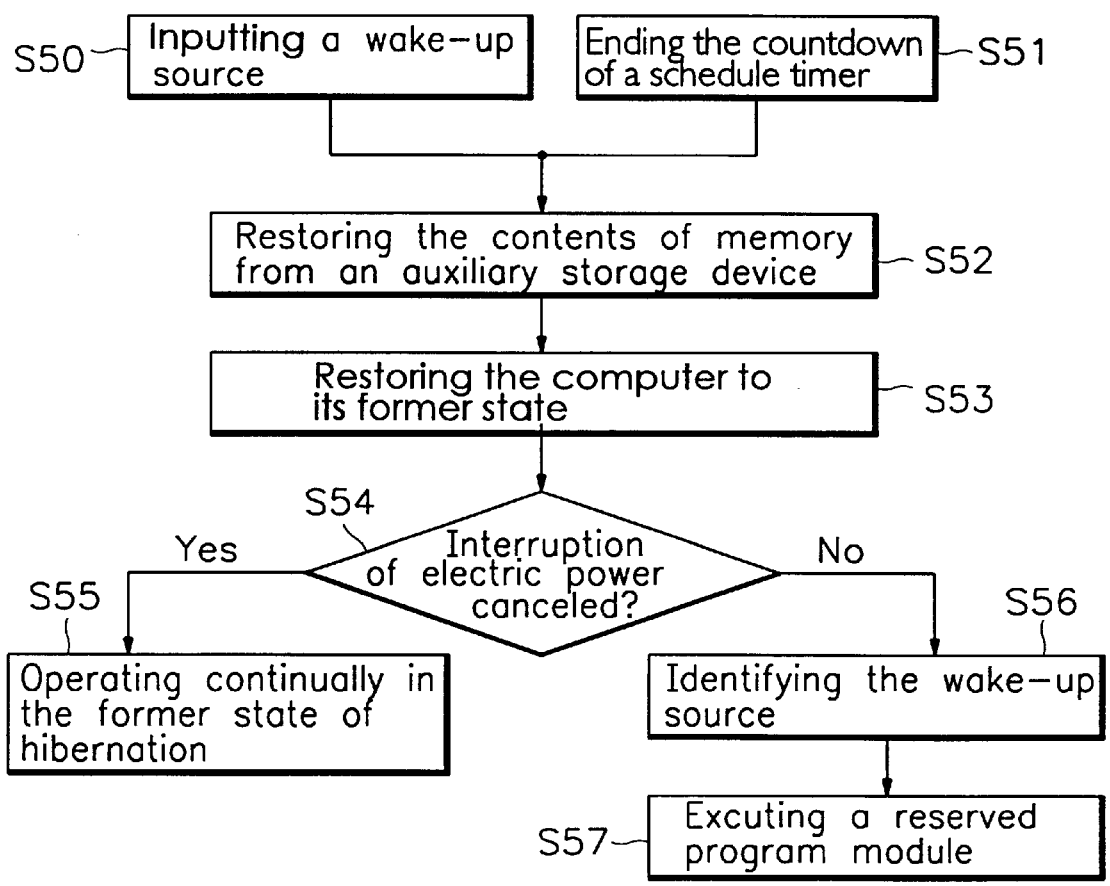
FIG. 5 shows the resumption process of the hibernation module of FIG. 3.

As shown in FIG. 5, the process of resuming the operation of the system after hibernation requires input of a signal from a wake-up source (S50); ending the countdown of a schedule timer (S51); restoring the contents of a memory from an auxiliary storage device (S52); restoring the stored former state of the computer (S53); determining whether interruption of electric power has been canceled (S54); operating continually in the former state of hibernation (S55); identifying the wake-up source (S56); and executing a reserved program module (S57).

The operation of a system for identifying visitors in accordance with a preferred embodiment will now be described. The hibernation control circuit 230 produces a wake-up signal if a visitor pushes the call-bell button 130 when an user is absent. The wake-up signal is then inputted to the CPU 240. The suspend mode of the computer is changed to a resume mode, and the CCTV camera 10 receives the image data of a visitor in accordance to the brightness thereof and outputs the image data to the video overlay card 210. The voice of a visitor is converted to a electrical signal by the microphone 120 and input into the sound card 220. The CPU 240 then controls the above devices, and stores the image and the sound data captured in the video overlay card 210 and the sound card 220 in an auxiliary storage device. After the established hours, the computer is placed in a suspend mode and identifies visitors while in a power saving state.

The operation of a system for identifying visitors will now be described with reference FIG. 3. First, the CPU determines whether the wake-up signal has been inputted when it is in a suspend mode state. When the wake-up signal has been inputted, the CPU determines if the wake-up signal is a signal from a call-bell button or a modem or a facsimile or a timer schedule which may be provided by the timer 500. If the wake-up signal is the signal from a call-bell button, the CPU 240 receives the image data outputted from the CCTV 10 camera through the video overlay card 210 and outputs it to the monitor 300. The sound data of a visitor is inputted to the sound card 220. The CPU 240 outputs the signal to the above devices to capture the above image data and store the image data in an auxiliary storage device 250. After completing the work, the computer is put into a suspend mode and the power is turned off.

The suspension mode process will now be described with reference FIG. 4. When the computer operates, the timer for PMS checks a bus operation during regular hours. The hibernation signal is produced when the computer system is not being operated or the on-signal of the UPS has been inputted to the PMS. The hardware state is then checked and stored, and the data presently in the memory is stored. After storing, the power-off-signal is outputted to the SMPS and the CPU determines whether the hibernation signal was produced by the interruption of electric power. If the hibernation signal is produced by the interruption of electric power, the battery power is turned off and the system is placed in the suspend mode.

And, if not, the main power is turned off and the battery is supplied with power and the system placed in the suspend mode. As shown in FIG. 5, the computer system is restored to the former state prior to hibernation by restoring the contents of the memory after the inputting of a wake-up source and ending the countdown of the schedule timer. And then, the CPU determines whether the interruption of electric power in the hibernation state has been canceled. When the interruption of electric power has been canceled, the CPU continuous to operate in the former state of hibernation. If not, the CPU confirms the wake-up source and executes a reserved program module.

A system for identifying visitors of the present invention provides a system for storing the visitor's image sensed from an identification device while the owner of the premises is absent and later reconfirms the identification by using a general purpose home computer, such as an inexpensive computer equipped with a power saving hibernation function. In essence, the computer serves as a multimedia computer having an image capturing function, an audio recording function, and a hibernation function which is in a power saving mode during normal times. It maybe seen therefore, that the present invention only requires a general purpose home computer having a multi-media function and a CCTV camera. The present invention does not use expensive equipment and enables the owner to perform the function of editing and identifying data easily and without the necessity of resorting to reviewing an entire video tape.

What is claimed is:

1. A system for identifying visitors, comprising:
    a closed-circuit television camera for generating image data obtained by reading images of the visitors;
    a microphone for receiving and converting sound waves from the visitors into electrical signals;
    a computer functionally connected to receive said image data and said electrical signals;
    a call-bell button for providing a call-bell function when a visitor calls, operatively connected to a hibernation control circuit for outputting a resume signal for driving said computer to terminate a hibernation state by storing and processing said image data from said closed-circuit television camera and said electrical signals from said microphone; and
    a monitor for displaying visual video representations of said image data;
    said computer comprising:
        a means for starting a process of inactivating the computer when a timer for a power management system checks a bus operation during regular hours;
        a means for inputting an on-signal to an uninterruptible power supply in response to interruption of electric power into the power management system;
        said hibernation control circuit producing and outputting a hibernation signal to said computer;
        a means for checking and storing a present state of hardware of said computer;
        a means for storing the present operation state of said computer in a memory;
        a means for transmitting a power-off-signal to a switching mode power supply;
        a means for determining whether an interruption of electric power to said computer has occurred;
        a means for turning the power of a battery off by the switching mode power supply if it has been determined that an interruption of electric power has occurred;
        a means for turning a main power off and supplying the battery with power if it has been determined that an interruption of electric power has not occurred; and
        a means for subsequently maintaining said computer in a hibernation state.

2. A system for identifying visitors, comprising:
    a closed-circuit television camera for generating image data obtained by reading images of the visitors;
    a microphone for receiving and converting sound waves from the visitors into electrical signals;
    a computer functionally connected to receive said image data and said electrical signals;
    a call-bell button for providing a call-bell function when a visitor calls, operatively connected to a hibernation control circuit for outputting a resume signal for driving said computer to terminate a hibernation state by storing and processing said image data from said closed-circuit television camera and said electrical signals from said microphone; and
    a monitor for displaying visual video representations of said image data;
    said computer system comprising:
        a means for inputting a wake-up source signal to said computer;
        a means for ending a countdown of a schedule timer of said computer;
        a means for restoring contents of a memory of said computer from an auxiliary storage device;
        a means for restoring a previously stored former state of said computer;
        a means for determining whether an interruption of electric power to said computer has been canceled;
        a means for operating said computer continuously in a former state of hibernation if the interruption of electric power has been canceled; and
        a means for identifying the wake-up source and executing a reserved program module if the interruption of electric power has not been canceled.

3. A method of operating an identifying module of a system for identifying visitors, comprising the steps of:
    determining whether a wake-up signal has been inputted;
    initiating functional operation of a computer in response to said wake-up signal;
    making a determination of whether said wake-up signal is a signal from a call-bell button;
    capturing image and sound data from the visitors after determining that said wake-up signal is from said call-bell button;
    converting the computer to a suspend mode after completion of said capturing of said image and said sound data;
    turning the computer off and supplying a battery with power if it has been determined that an interruption of electric power has not occurred; and
    subsequently maintaining the computer in a hibernation state;
    said converting step comprising the steps of:
        starting process of inactivating the computer when a timer for a power management system checks a bus operation during regular hours;
        inputting an on-signal to an uninterruptible power supply in response to an interruption of electric power into the power management system;
        producing and outputting a hibernation signal to the computer;

checking and storing a present state of hardware of the computer;

storing the present operational state of the computer in a memory;

transmitting a power-off-signal to a switching mode power supply;

determining whether an interruption of electric power to the computer has occurred;

turning the power of a battery off by the switching mode power supply if it has been determined that an interruption of electric power has occurred;

turning a main power off and supplying the battery with power if it has been determined that an interruption of electric power has not occurred; and subsequently maintaining the computer in a hibernation state.

4. A method of operating an identifying module of a system for identifying visitors, comprising the steps of:

determining whether a wake-up signal has been inputted;

initiating functional operation of a computer in response to said wake-up signal;

making a determination of whether said wake-up signal is a signal from a call-bell button;

capturing image and sound data from the visitors after determining that said wake-up signal is from said call-bell button;

converting the computer to a suspend mode after completion of said capturing of said image and said sound data;

turning the computer off and supplying a battery with power if it has been determined that an interruption of electric power has not occurred; and subsequently maintaining the computer in a hibernation state;

said resuming step comprising the steps of:

inputting a wake-up source signal to a computer;

ending a countdown of a schedule timer of the computer;

restoring contents of a memory of the computer from an auxiliary storage device;

restoring a previously stored former state of the computer;

determining whether an interruption of electric power to said computer has been canceled;

operating said computer continuously in a former state of hibernation if the interruption of electric power has been canceled; and identifying the wake-up source and executing a reserved program module if the interruption of electric power has not been canceled.

* * * * *